(12) United States Patent
Wilkinson

(10) Patent No.: US 9,892,008 B2
(45) Date of Patent: Feb. 13, 2018

(54) COPY-ON-READ PROCESS IN DISASTER RECOVERY

(71) Applicant: International Business Machines Corporation, Armonk, NY (US)

(72) Inventor: John P. Wilkinson, Winchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 18 days.

(21) Appl. No.: 14/735,886

(22) Filed: Jun. 10, 2015

(65) Prior Publication Data

US 2016/0004602 A1 Jan. 7, 2016

(30) Foreign Application Priority Data

Jul. 3, 2014 (GB) .................................. 1411918.4

(51) Int. Cl.
*G06F 11/00* (2006.01)
*G06F 11/20* (2006.01)

(52) U.S. Cl.
CPC ...... *G06F 11/2082* (2013.01); *G06F 11/2074* (2013.01); *G06F 11/2064* (2013.01)

(58) Field of Classification Search
CPC ....... G06F 11/2056–11/2097; G06F 17/30371; G06F 3/067
See application file for complete search history.

(56) References Cited

U.S. PATENT DOCUMENTS

| 6,467,054 | B1 * | 10/2002 | Lenny ................... G06F 11/004 369/53.17 |
| 6,785,789 | B1 | 8/2004 | Kekre et al. |
| 7,032,089 | B1 | 4/2006 | Ranade et al. |
| 7,149,787 | B1 | 12/2006 | Mutalik et al. |

(Continued)

FOREIGN PATENT DOCUMENTS

WO 2009020978 A2 2/2009

OTHER PUBLICATIONS

IBM, "High availability disaster recovery (HADR)", http://www-01.ibm.com/support/knowledgecenter/api/content/nl/en-us/, retrieved Apr. 9, 2015, pp. 1-2.

(Continued)

*Primary Examiner* — Jason Bryan
(74) *Attorney, Agent, or Firm* — Zilka-Kotab, P.C.

(57) ABSTRACT

Systems, methods, and computer products for copy-on-read processes in disaster recovery include: making a disaster recovery storage volume available for read access before all data from a corresponding primary storage volume has been copied to a disaster recovery storage volume; maintaining a record of regions of the disaster recovery storage volume; in response to receiving a read request for data at the disaster recovery system: looking up the record of regions of the disaster recovery storage volume to determine available data for the read request; reading any available data from the disaster recovery storage volume; obtaining data unavailable at the disaster recovery storage volume from the corresponding primary storage volume; updating the disaster recovery storage volume with the obtained data; supplying the obtained data to the read request; and updating the record of regions of the disaster recovery storage volume for the regions of the obtained data.

21 Claims, 5 Drawing Sheets

(56) References Cited

U.S. PATENT DOCUMENTS

| | | |
|---|---|---|
| 7,571,290 B1 | 8/2009 | Ranade et al. |
| 7,941,622 B2 | 5/2011 | Yagawa et al. |
| 8,001,085 B1 | 8/2011 | Kiselev |
| 8,359,491 B1 | 1/2013 | Bloomstein |
| 8,560,886 B1 | 10/2013 | Kekre et al. |
| 8,793,527 B1* | 7/2014 | Franks .................... G06F 3/067 709/219 |
| 2005/0071549 A1* | 3/2005 | Tross ................. G06F 11/2076 711/113 |
| 2008/0072003 A1 | 3/2008 | Vu et al. |
| 2010/0094802 A1* | 4/2010 | Luotojarvi ........ G06F 17/30327 707/609 |
| 2013/0036091 A1 | 2/2013 | Provenzano et al. |
| 2013/0036098 A1 | 2/2013 | Mutalik et al. |
| 2014/0201426 A1* | 7/2014 | Ma ..................... G06F 12/0246 711/103 |

OTHER PUBLICATIONS

United Kingdom Search Report and Written Opinion from PCT Application No. GB920140046GB1, dated Jan. 12, 2015.
Wilkinson, J., U.S. Appl. No. 15/801,121, dated Nov. 1, 2017.

* cited by examiner

COPY-ON-READ PROCESS IN DISASTER RECOVERY

RELATED APPLICATIONS

This application claims priority to U.K. Patent Application No. 1411918.4, filed Jul. 3, 2014 and entitled "Copy-On-Read Process in Disaster Recovery," the contents of which are herein incorporated by reference.

BACKGROUND

This invention relates to the field of disaster recovery systems. In particular, the presently disclosed inventive concepts relates to a copy-on-read process in a disaster recovery system.

When a storage system replicates volumes to disaster recovery (DR) locations, the initial replication can take some time. There is often a requirement to mount the volumes at the DR location on a server system, which may only happen once the initial replication has completed. This means that the total time that passes before having the volumes successfully mounted is greater than it need be.

In the prior art, an initial synchronisation process may typically be driven from the production or primary system, using a high water mark or bitmap to drive copying each region in turn. The primary system will read a region from the primary storage, and transmit it to the DR system, which will write it to the DR storage. Before a region has been copied to the secondary system, host writes to that region are allowed to update the primary storage without needing to immediately replicate that change to the DR system. After a region has been copied, the primary system ensures that subsequent host writes to that region are immediately replicated to the DR storage in order to keep the copies synchronised.

Therefore, there is a need in the art to address the aforementioned problems.

BRIEF SUMMARY

In one embodiment, a method for copy-on-read process in disaster recovery, includes: making a disaster recovery storage volume available at a disaster recovery system for read access before all data from a corresponding primary storage volume has been copied to the disaster recovery storage volume; maintaining a record of regions of the disaster recovery storage volume, wherein a region is marked if a copy of data is available on the disaster recovery storage volume; in response to receiving a read request for data at the disaster recovery system: looking up the record of regions of the disaster recovery storage volume to determine available data for the read request; reading any available data from the disaster recovery storage volume; for any data unavailable at the disaster recovery storage volume, obtaining the unavailable data from the corresponding primary storage volume; updating the disaster recovery storage volume with the obtained data; supplying the obtained data to the read request; and updating the record of regions of the disaster recovery storage volume for the regions of the obtained data.

In another embodiment, a system for copy-on-read process in disaster recovery, includes: a disaster recovery storage volume available at a disaster recovery system for read access before all data from a corresponding primary storage volume has been copied to the disaster recovery storage volume; a record of regions of the disaster recovery storage volume, wherein a region is marked if a copy of data is available on the disaster recovery storage volume; and a disaster recovery replication component configured to receive a read request for data at the disaster recovery system, the disaster recovery replication component further comprising: a disaster recovery record look up component configured to look up the record of regions to determine available data for the read request; a disaster recovery read component configured to read any available data from the disaster recovery storage volume; and a primary copy component further comprising: a primary message component configured to obtain any unavailable data from the corresponding primary storage volume, a disaster recovery write component configured to update the disaster recovery storage volume with the obtained data, a host reply component configured to supply the obtained data to the read request, and a record mark up component configured to update the record of regions for the regions of the obtained data.

In yet another embodiment, a computer program product for copy-on-read process in disaster recovery, the computer program product comprising a computer-readable storage medium having computer-readable program code embodied therewith. The computer-readable program code is configured to: make a disaster recovery storage volume available at a disaster recovery system for read access before all data from a corresponding primary storage volume has been copied to the disaster recovery storage volume; maintain a record of regions of the disaster recovery storage volume wherein a region is marked if a copy of data is available on the disaster recovery storage volume; in response to receipt of a read request for data at the disaster recovery system: look up the record of regions to determine available data for the read request; read any available data from the disaster recovery storage volume; obtain any unavailable data from the corresponding primary storage volume; update the disaster recovery storage volume with the obtained data; supply the obtained data to the read request; and update the record of regions for the regions of the obtained data.

Other exemplary embodiments within the scope of the presently disclosed inventive concepts will be described in further detail below with reference to the drawings. The foregoing exemplary embodiments are not to be considered limiting on the scope of those inventive concepts in any way.

BRIEF DESCRIPTION OF THE SEVERAL VIEWS OF THE DRAWINGS

The subject matter regarded as the presently disclosed inventive concepts is particularly pointed out and distinctly claimed in the concluding portion of the specification. The presently disclosed inventive concepts, both as to organization and method of operation, together with objects, features, and advantages thereof, may best be understood by reference to the following detailed description when read with the accompanying drawings.

Illustrative embodiments of the presently disclosed inventive concepts will now be described, by way of example only, with reference to the following drawings.

Figure 1:
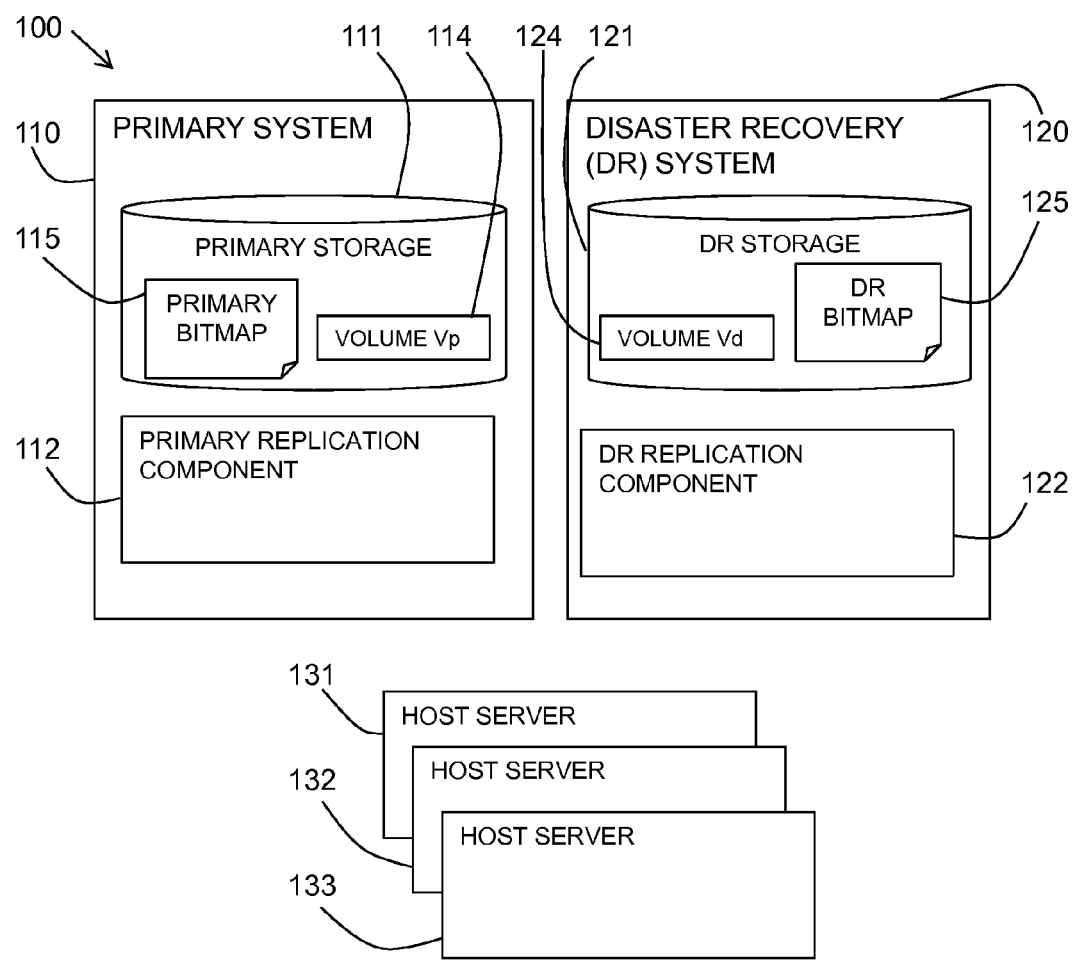
FIG. 1 is a block diagram of an embodiment of a system in accordance with the presently disclosed inventive concepts.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the presently disclosed inventive concepts. However, it will be understood by those skilled in the art that the presently disclosed inventive concepts may be practiced without these specific details. In other instances, well-known methods, procedures, and components have not been described in detail so as not to obscure the presently disclosed inventive concepts.

Method and system are provided for a copy-on-read process to provide just-in-time data for reads at a disaster recovery system. As soon as the relationship is started, the DR copy may be mounted and used. This cuts down the time before a usable DR solution is in place.

For this method and system, the initial synchronisation process is allowed to be driven from the DR system. Consider a single volume being replicated initially, with Vp being the primary volume, and Vd being the DR volume. When the DR system determines a region should be replicated, it sends a read request to the primary system. The primary site reads the data requested and returns it to the DR system.

Both the primary and DR systems maintain structures for each volume, which record which regions have been copied. In this description a bitmap is used to store this information. Alternative methods include hash tables and B-trees, which have various advantages and disadvantages relative to each other common to all uses of such methods. A region may correspond in size to the minimum write granularity of the attached host systems, so regions are always entirely written, or they may correspond to a larger amount of data, for example, a megabyte.

Both DR and primary systems use the bitmap to record the synchronisation process. The primary system sets bits to record it has sent initial data for a region to the DR system, and uses the bit to determine whether later host writes should be immediately replicated to the DR system. The DR system sets a bit in the bitmap for each region for which an up-to-date copy is present on the secondary DR storage.

According to a first aspect of the presently disclosed inventive concepts there is provided a method for copy-on-read process in disaster recovery, comprising: making a disaster recovery storage volume available at a disaster recovery system for read access before all the data from a corresponding primary storage volume has been copied to the disaster recovery storage volume; maintaining a record of regions of the disaster recovery storage volume wherein a region is marked if a copy of data is available on the disaster recovery storage volume; on receipt of a read request for data at the disaster recovery system, carrying out the step of: looking up the record to determine available data for the read at the disaster recovery storage volume; reading any available data from the disaster recovery storage volume; obtaining any unavailable data from the corresponding primary storage volume, updating the disaster recovery storage volume with the obtained data, supplying the obtained data to the read request, and updating the record for the regions of the obtained data.

The method may include maintaining a record of regions of a corresponding primary storage volume wherein a region is marked when initial data is sent to a disaster recovery system; and using the record to determine whether later writes should be immediately replicated to the disaster recovery system.

A region in the record may correspond in size to a minimum write granularity of attached host systems or a larger amount of data.

The step of looking up the record for a read request for data at the disaster recovery system may include: looking up marking in the record for the logical block addresses in the range of the read request; and reading any available data from the disaster recovery storage volume for the available logical block addresses.

The step of obtaining any unavailable data from the corresponding primary storage volume may include obtaining a range of data extended such that it comprises the range of the read request and comprises an integer number of regions.

The step of supplying the obtained data to the read request may include satisfying the read request from the disaster recovery storage volume or from copied data in system memory.

In one embodiment, the record is a bitmap with each bit corresponding to a region of the volume. In alternative embodiments, the record is a hash table or a B-tree.

The method may further include: determining if overlapping read requests are received at the disaster recovery system; only obtaining one copy of data from the primary system for overlapping read requests.

The method may further include: determining if there is an interruption during obtaining data from the primary system; resubmitting a copy request immediately or failing the read request.

The method may further include: receiving an update for a region of the disaster recovery volume from the primary system; and if there is no marking in the record for the region that a copy of data is available on the disaster recovery storage volume, discarding the update.

The method may further include prioritising uncopied regions to be obtained from the primary system.

According to a second aspect of the presently disclosed inventive concepts there is provided a system for copy-on-read process in disaster recovery, comprising: a disaster recovery storage volume available at a disaster recovery system for read access before all the data from a corresponding primary storage volume has been copied to the disaster recovery storage volume; a record of regions of the disaster recovery storage volume wherein a region is marked if a copy of data is available on the disaster recovery storage volume; and a disaster recovery replication component for receiving a read request for data at the disaster recovery system and including: a disaster recovery record look up component for looking up the record to determine available data for the read at the disaster recovery storage volume; a disaster recovery read component for reading any available data from the disaster recovery storage volume; a primary copy component including a primary message component for obtaining any unavailable data from the corresponding primary storage volume, a disaster recovery write component for updating the disaster recovery storage volume with the obtained data, a host reply component for supplying the obtained data to the read request, and a record mark up component for updating the record for the regions of the obtained data.

The system may include at a primary system: a record of regions of a corresponding primary storage volume wherein a region is marked when initial data is sent to a disaster recovery system; and a record monitoring component for using the record to determine whether later writes should be immediately replicated to the disaster recovery system.

The disaster recovery record look up component for looking up the record for a read request for data at the disaster recovery system may include: looking up marking in the record for the logical block addresses in the range of the read request; and reading any available data from the disaster recovery storage volume for the available logical block addresses.

The primary copy component for obtaining any unavailable data from the corresponding primary storage volume may include a range extending component for obtaining a range of data extended such that it comprises the range of the read request and comprises an integer number of regions.

The host reply component for supplying the obtained data to the read request may include satisfying the read request from the disaster recovery storage volume or from copied data in system memory.

The system may further include an overlapping read component for: determining if overlapping read requests are received at the disaster recovery system; only obtaining one copy of data from the primary system for overlapping read requests.

The system may further include an interruption component for: determining if there is an interruption during obtaining data from the primary system; resubmitting a copy request immediately or failing the read request.

The system may further include an update component for: receiving an update for a region of the disaster recovery volume from the primary system; and if there is no marking in the record for the region that a copy of data is available on the disaster recovery storage volume, discarding the update.

The system may further include a prioritising component for prioritising uncopied regions to be obtained from the primary system.

According to a third aspect of the presently disclosed inventive concepts there is provided a computer program product for copy-on-read process in disaster recovery, the computer program product comprising a computer-readable storage medium having computer-readable program code embodied therewith, the computer-readable program code configured to: making a disaster recovery storage volume available at a disaster recovery system for read access before all the data from a corresponding primary storage volume has been copied to the disaster recovery storage volume; maintaining a record of regions of the disaster recovery storage volume wherein a region is marked if a copy of data is available on the disaster recovery storage volume; on receipt of a read request for data at the disaster recovery system, carrying out the step of: looking up the record to determine available data for the read at the disaster recovery storage volume; reading any available data from the disaster recovery storage volume; obtaining any unavailable data from the corresponding primary storage volume, updating the disaster recovery storage volume with the obtained data, supplying the obtained data to the read request, and updating the record for the regions of the obtained data.

Further aspects may include computer program stored on a computer readable medium and loadable into the internal memory of a digital computer, comprising software code portions, when said program is run on a computer, for performing the method steps of any of the additional features of the first aspect of the presently disclosed inventive concepts.

According to a fourth aspect of the presently disclosed inventive concepts there is provided a method substantially as described with reference to the figures.

According to a fifth aspect of the presently disclosed inventive concepts there is provided a system substantially as described with reference to the figures.

The described aspects of the presently disclosed inventive concepts provide the advantage of allowing the server systems at DR locations to mount volumes before they have completely replicated.

Referring to FIG. 1, a system 100 is shown with a primary system 110 which comprises a primary storage system 111 including a volume Vp 114 which is required to be copied for disaster recovery. The primary system 110 comprises a primary replication component 112 for executing the replication process.

A disaster recovery system 120 is provided with a DR storage system 121 at which the replicated volume Vd 124 corresponding to primary volume Vp 114 may be stored. A DR replication component 122 is provided for executing the replication process at the DR system 120.

One or more host servers 131-133 may wish to access the replicated data via the DR system 120.

In the described system, the primary system 110 and the DR system 120 maintain records in the form of bitmaps. The primary system 110 maintains a primary bitmap 115 and the DR system 120 maintains a DR bitmap 125. The bitmaps 115, 125 are of regions of the volume being replicated (volume Vp 114) and are used to record the synchronisation of the replication process. Each bit in the bitmaps 115, 125 corresponds to a region of the volume being replicated.

The primary bitmap 115 sets bits to record it has sent initial data for a region to the DR system 120, and uses the bit to determine whether later host writes should be immediately replicated to the DR system 120.

The DR bitmap 125 sets a bit in the bitmap for each region for which an up-to-date copy is present on the secondary DR storage 121.

Figure 2:
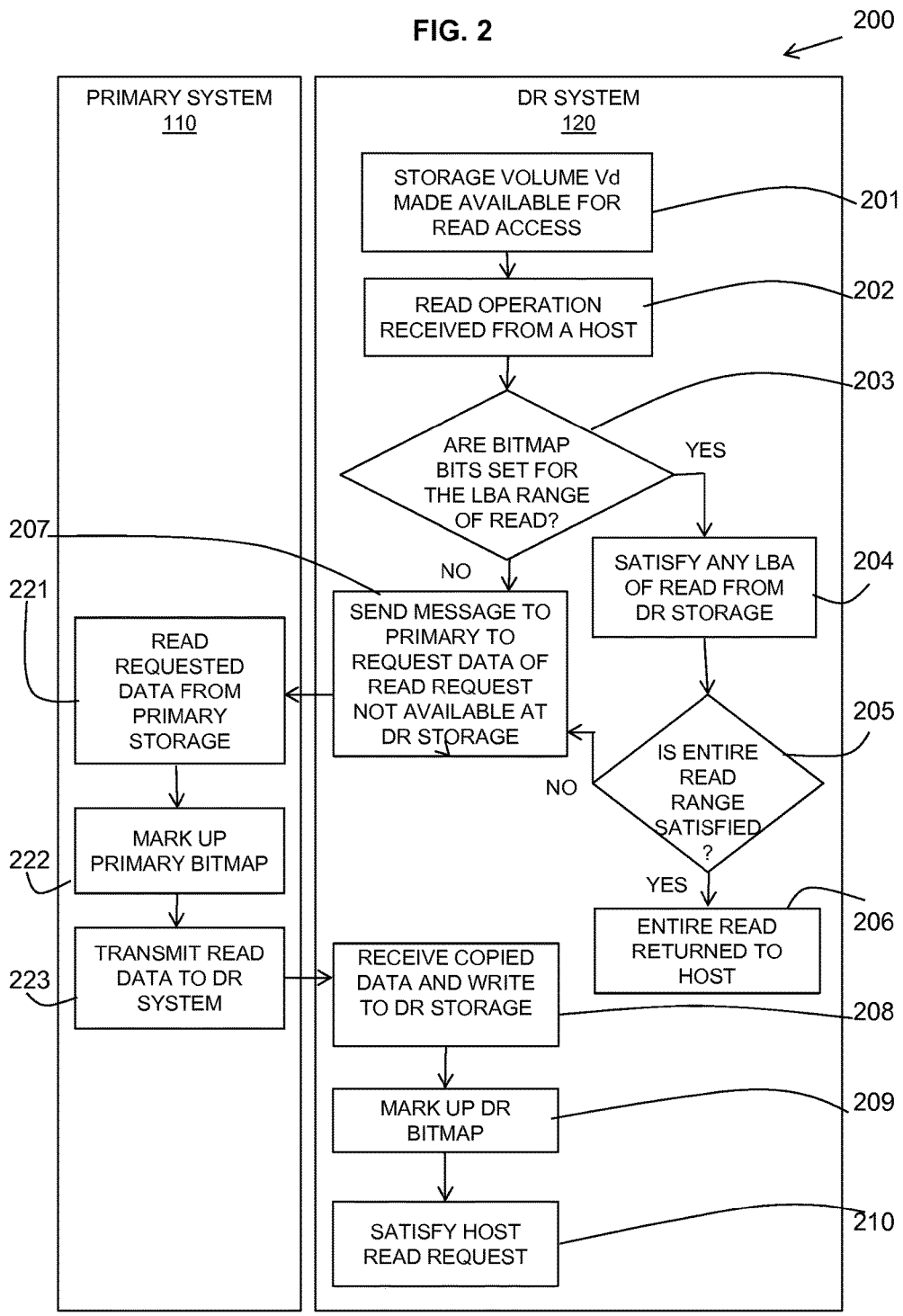
FIG. 2 is a flow diagram of an embodiment of a method in accordance with the presently disclosed inventive concepts.

Referring to FIG. 2, a flow diagram 200 shows a replication process as carried out by the DR replication component 122 of the DR system 120 and the primary replication component 112 of the primary system 110 shown in FIG. 1.

As soon as the replication is started, the DR storage system's volume Vd 124 is made available 201 for read access for external host systems 131-133 at the DR site.

If a read operation is received 202 as submitted by a host to Vd, the DR storage system 121 examines its bitmap 125 for that volume, locating the bits for the logical block address (LBA) range of the read. It is determined 203 if any bits for the LBA range of the read are set in the bitmap.

For any LBA that has a set bit in the DR bitmap 125, the DR storage system 121 has a valid up-to-date copy, and that LBA of the read can be satisfied by reading 204 from the DR storage system 121. It is determined if 205 the entire host read can be satisfied in such a way. If so, then it can be simply returned 206 to the host.

If a read is received for which at least some of the LBA range has bits not set in the DR bitmap, there is no valid data on volume Vd for that region. The DR system sends 207 a message to the primary system to request the data be copied. The range requested is extended such that it comprises the range of the host read needed, but comprises an integer number of regions, and thus the copying can be tracked at a region granularity.

The primary system reads 221 the data for that range from Vp, and marks 222 its bitmap for those regions so any later writes to that range are immediately replicated. It transmits 223 the copied data to the DR system.

The DR system receives 208 the copied data and writes it in DR storage, and marks 209 the DR bitmap, so any subsequent reads for that region are serviced from the DR storage Vd. The original host read may be serviced 210 from Vd, or the DR system may retain the copied data in system memory and use it to satisfy the host read directly.

There are some additional considerations for events that can happen during this process, from when the read request is submitted to the DR system to the point where the data has been replicated and the DR bitmap updated.

An event may occur that another read of that region may be submitted by the same or a different host system. This read could be to the same LBA range, a subset, a superset, or an overlapping range of LBAs. In this case, the DR system must detect that a copy request is already outstanding for the same region, and must send a copy message to the primary system only for regions that have not already been requested. When all regions have been copied to Vd, the read can be satisfied from that as before. This part of the design requires that overlapping requests can be detected. For a clustered system, this may be done through sending messages between nodes to test if any overlapping requests are known of be any node, or by making a single node responsible for sending copy requests to the primary system on behalf of any given DR volume.

Another event that may happen during a copy request is that it may be interrupted temporarily (the data link between sites may be lost, or access may be lost to the primary or DR storage) or fail permanently (e.g. the primary data read may fail). When a copy request is interrupted, if the DR system is able to resubmit the copy request immediately, it will do so, and attempt to service the host read or reads waiting for the copy request when the new request completes. If the DR system is not able to resubmit the copy request immediately, it will fail the host read requests in a similar way to offline storage. If the copy request fails permanently, the host read requests will be failed. The storage system may notify the user of the system that a failure condition has occurred and needs to be resolved.

Until the bit is set on the DR bitmap, host reads on Vd will not use the data on Vd, so the ordering of updating that bit last is critical to ensuring that an interrupted copy does not result in reads seeing invalid data. The bit will be set on the primary bitmap as soon as it transmits copy data to the secondary, which means that it will be replicating on going host writes for that region to the DR system. If the DR system receives the ongoing write replication before it has received the copy data requested from the primary system, it knows that it has no valid data for that region (as the bit in its bitmap for that region is clear) and can discard those writes.

There may be a limited number of copy request objects available for the DR system to use to drive data being copied from the primary system. If there are read requests outstanding on the DR system, the copy request objects should be used to obtain data to complete them by preference. If there are more copy request objects available than regions needing to be copied to satisfy outstanding read requests, they should be used to drive replication of other regions of replicated volumes.

The process of replicating other regions should attempt to prioritise uncopied regions likely to be read soon, in similar way to a read-ahead feature in a cache. When a read is submitted by a host, we copy the regions needed to satisfy it, and also attempt to copy the regions immediately following it. The number of additional regions to be read should be determined by the number of copy request objects, the number of regions currently being requested and the time taken for a copy request operation. If there have been no reads for a while on Vd, or at all, uncopied regions should be copied in order from LBA 0 to the end of the volume. This is a reasonable prioritisation as useful data, and in particular boot and mount data, tends to be located near the start of a volume.

Figure 3:
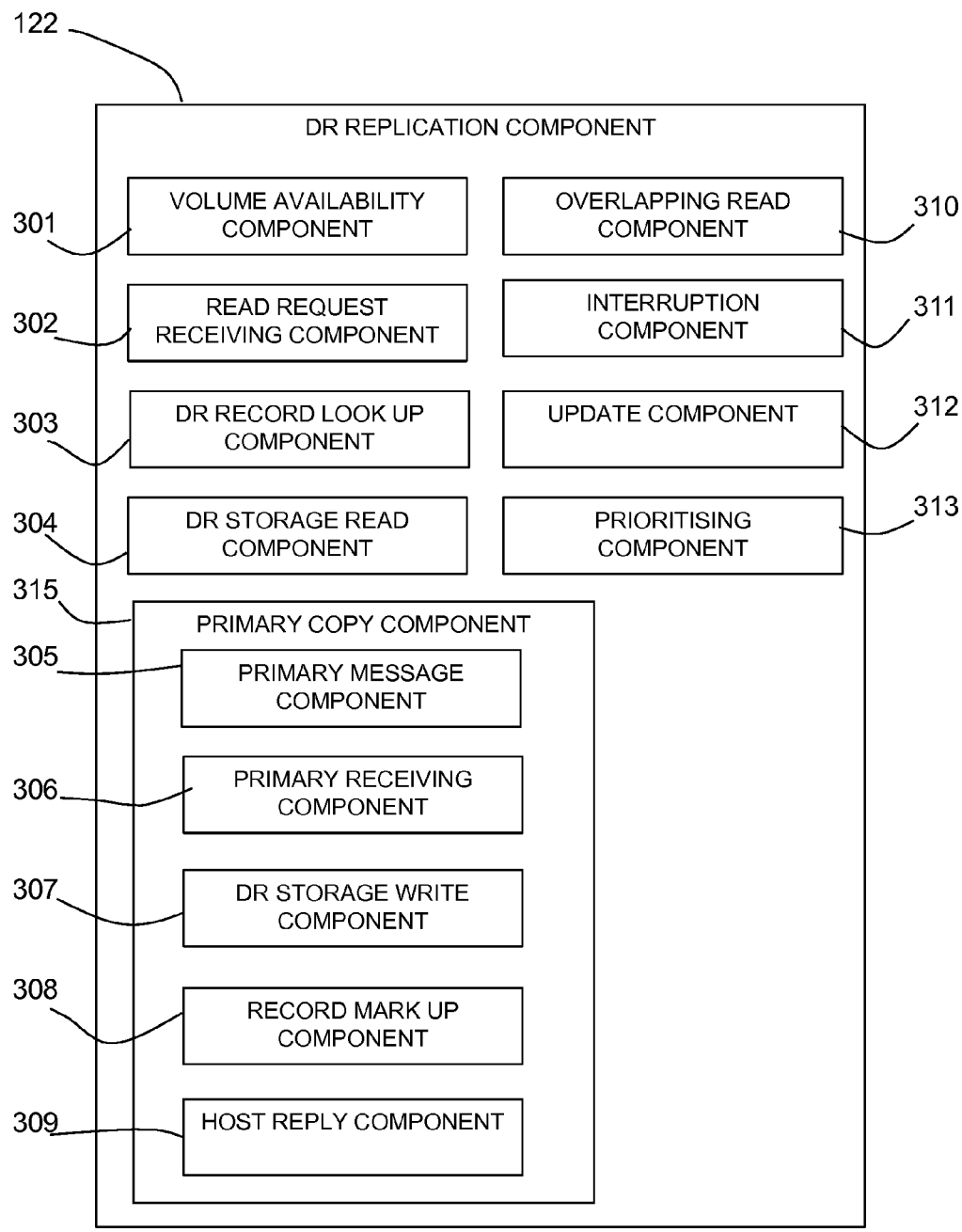
FIG. 3 is block diagram of an embodiment of a system in accordance with the presently disclosed inventive concepts.
Figure 4:
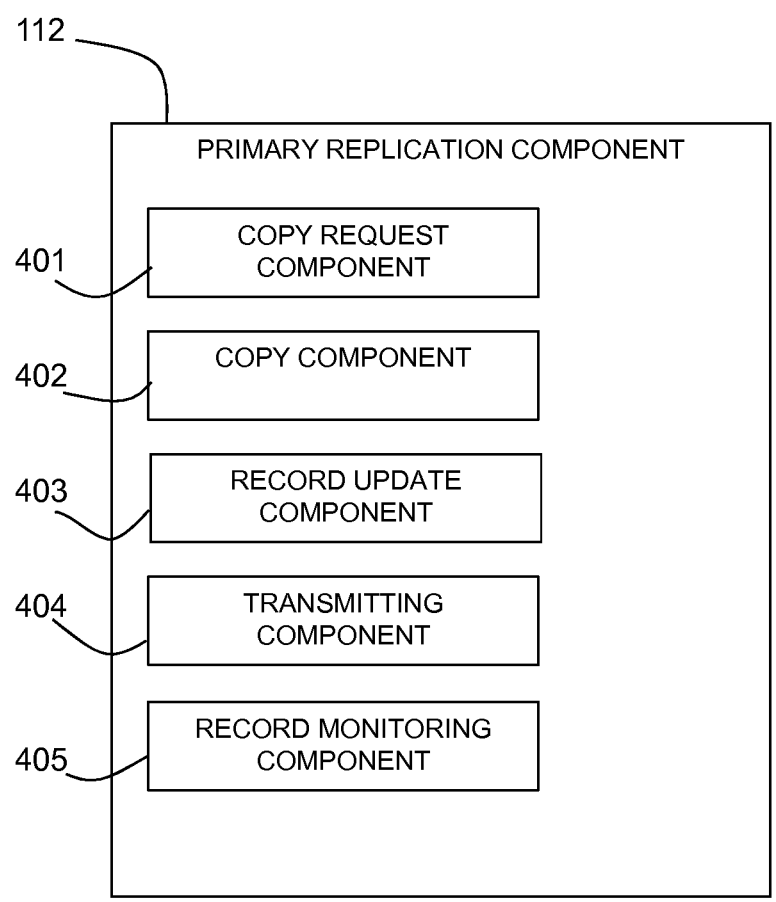
FIG. 4 is a block diagram of an embodiment of a further aspect of a system in accordance with the presently disclosed inventive concepts.

FIGS. 3 and 4 show example embodiments of a DR replication component 122 and a primary replication component 112. However, it is understood that for each volume in the storage system, both roles may be appropriate and the associated components provided. The system acting as the primary system for one replication may act as the DR system for another replication. Also, a DR system may replicate data from many primary systems, and every primary system may replicated to many DR systems.

Referring to FIG. 3, a block diagram shows an example embodiment of a DR replication component 122 of a DR system 120.

The DR replication component 122 may coordinate the treatment of read requests from host systems and may include the following components providing functions of the replication process.

A volume availability component 311 may be provided for making a volume at the DR storage available for read access by external host systems. A read request receiving component 302 may handle incoming read requests from host servers to the DR system. A DR record look up component 303 may look up the DR bitmap on receipt of a read request to determine if any bits of the LBA range of the read are set in the DR bitmap. A DR storage read component 304 may be provided for reading the available LBA from the DR storage and providing this to the host server.

A primary copy component 315 may be for obtaining copy data from the primary system including a primary message component 305 provided for sending a message to a primary system requesting a copy of data needed for a read request. The range of the data requested may be extended to an integer number of regions which include the data needed for the host read. A primary receiving component 306 may receive the copied data and a DR storage write component 307 may write the received data to the DR storage. A record mark up component 308 may also mark up the DR bitmap to set the bits for the copied data. A host reply component 309 may send the requested data for the read which is now available to the host server. This may be done from the DR storage or from the copied data retained in system memory.

Additional components may be provided in the DR replication component 122 to handle additional functionality. An overlapping read component 310 may handle overlapping reads from the same or different host servers to ensure that a data copy request to the primary system is not duplicated. An interruption component 311 may be provided to handle interruptions to a copy request. An update component 312 may be provided to discard update writes for data not yet copied at the DR storage. A prioritising component 313 may be provided to prioritise the data to be requested from the primary system.

Referring to FIG. 4, a block diagram shows an example embodiment of a primary replication component 112 of a primary system 110.

The primary replication component 112 may coordinate copy requests at the primary system 110 and updates to the primary bitmap.

A copy request component 401 may be provided to receive copy requests from the DR system. A copy component 402 may copy the requested data from the primary storage. A record update component 403 may update the primary bitmap to show the regions copied to the DR system. A transmitting component 404 may transmit the copied data to the DR system. A record monitoring component 405 may additionally copy data updates for any regions for which the primary bitmap bits are set.

Figure 5:
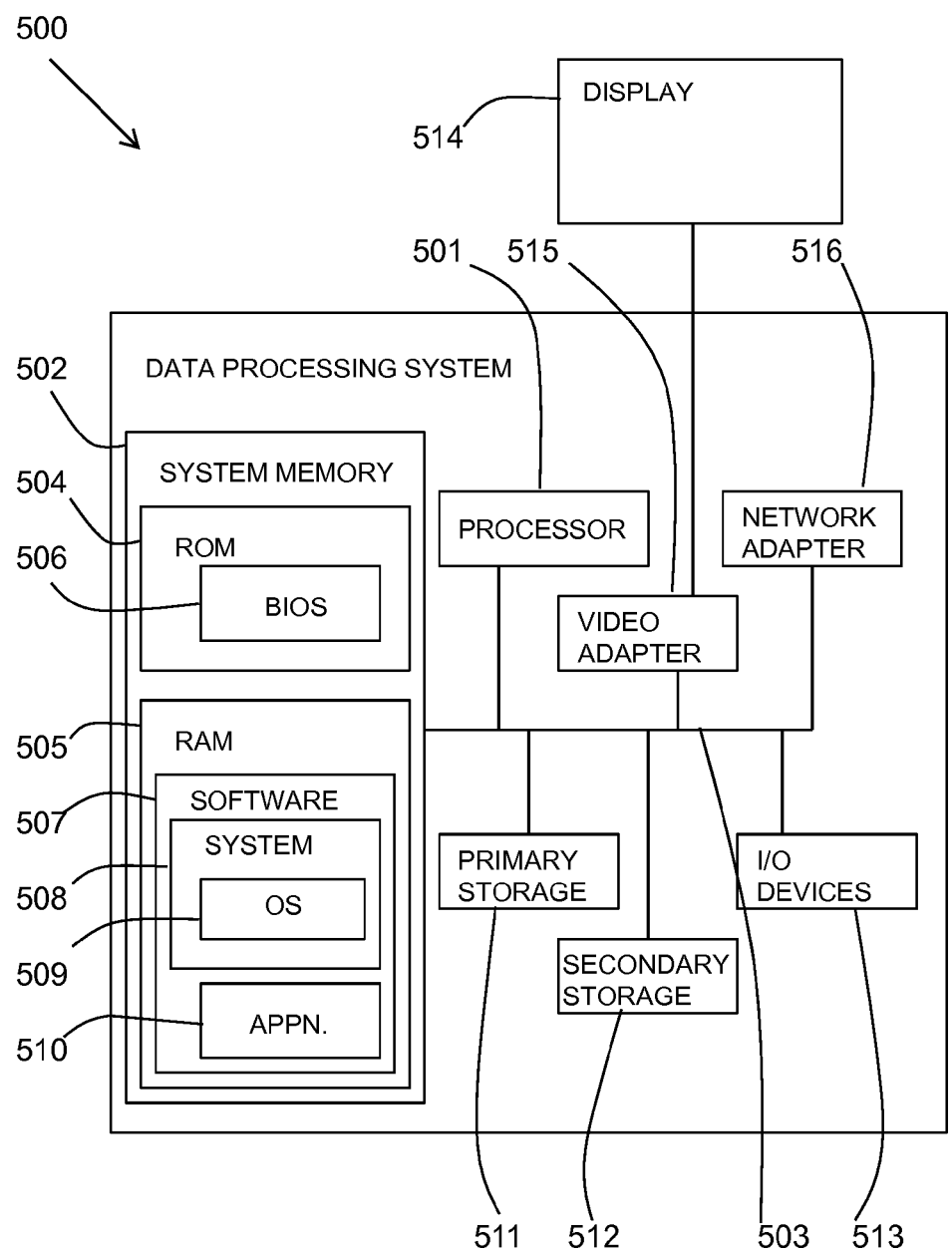
FIG. 5 is a block diagram of an embodiment of a computer system in which the presently disclosed inventive concepts may be implemented.

Referring to FIG. 5, an exemplary system for implementing aspects of the presently disclosed inventive concepts comprises a data processing system 500 suitable for storing and/or executing program code including at least one processor 501 coupled directly or indirectly to memory elements through a bus system 503. The memory elements may include local memory employed during actual execution of the program code, bulk storage, and cache memories which provide temporary storage of at least some program code in order to reduce the number of times code must be retrieved from bulk storage during execution.

The memory elements may include system memory 502 in the form of read only memory (ROM) 504 and random access memory (RAM) 505. A basic input/output system (BIOS) 506 may be stored in ROM 504. System software 507 may be stored in RAM 505 including operating system software 508. Software applications 510 may also be stored in RAM 505.

The system 500 may also include a primary storage means 511 such as a magnetic hard disk drive and secondary storage means 512 such as a magnetic disc drive and an optical disc drive. The drives and their associated computer-readable media provide non-volatile storage of computer-executable instructions, data structures, program modules and other data for the system 500. Software applications may be stored on the primary and secondary storage means 511, 512 as well as the system memory 502.

The computing system 500 may operate in a networked environment using logical connections to one or more remote computers via a network adapter 516.

Input/output devices 513 may be coupled to the system either directly or through intervening I/O controllers. A user may enter commands and information into the system 500 through input devices such as a keyboard, pointing device, or other input devices (for example, microphone, joy stick, game pad, satellite dish, scanner, or the like). Output devices may include speakers, printers, etc. A display device 514 is also connected to system bus 503 via an interface, such as video adapter 515.

It may be seen that the described method and system allows the DR copy of the data to be read at any time, and will always see consistent data with respect to the host system writes at the primary site, whether that data has already been copied or not. This will minimise the initial configuration time, and lower the time taken before the first DR capability is available. The use of a cross-system read redirect minimizes the time to initial disaster-recovery-copy availability.

Such a solution may also provide high availability by allowing all reads to be serviced by the copy request process if the storage for Vd is unavailable.

The described method and system are also usable with a group of volumes for which mutual consistency is required, for example, many volumes used for a single application, where the storage system performing replication provides such a feature.

The described method and system have the added advantage that every read of data that has not yet been synchronised is used to accelerate the synchronisation. This significantly improves the utility of the method.

The presently disclosed inventive concepts may be a system, a method, and/or a computer program product. The computer program product may include a computer readable storage medium (or media) having computer readable program instructions thereon for causing a processor to carry out aspects of the presently disclosed inventive concepts.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium comprises the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the presently disclosed inventive concepts may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the presently disclosed inventive concepts.

Aspects of the presently disclosed inventive concepts are described herein with reference to flowchart illustrations and/or block diagrams of methods, apparatus (systems), and computer program products according to embodiments of the presently disclosed inventive concepts. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the presently disclosed inventive concepts. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Improvements and modifications can be made to the foregoing without departing from the scope of the presently disclosed inventive concepts.

The invention claimed is:

1. A method for copy-on-read process in disaster recovery, comprising:
   making a disaster recovery storage volume available at a disaster recovery system for read access before all data from a corresponding primary storage volume has been copied to the disaster recovery storage volume;
   maintaining a record of regions of the disaster recovery storage volume, wherein a region is marked if a copy of data is available on the disaster recovery storage volume;
   in response to receiving a read request for data at the disaster recovery system:
      looking up the record of regions of the disaster recovery storage volume to determine available data for the read request;
      reading any available data from the disaster recovery storage volume;
      for any data unavailable at the disaster recovery storage volume, obtaining, the unavailable data from the corresponding primary storage volume;
      updating the disaster recovery storage volume with the obtained data;
   supplying the obtained data to the read request; and
      updating the record of regions of the disaster recovery storage volume for the regions of the obtained data;
   receiving an update for a region of the disaster recovery storage volume from a primary system; and
   in response to determining no marking exists in the record of regions for the region of the disaster recovery storage volume, discarding the update, and
   wherein the marking indicates that a copy of data is available on the disaster recovery storage volume.

2. The method as recited in claim 1, comprising:
   maintaining a record of regions of the corresponding primary storage volume wherein a region is marked when initial data is sent to a disaster recovery system; and
   using the record of regions of the corresponding primary storage volume to determine whether later writes should be immediately replicated to the disaster recovery system.

3. The method as recited in claim 1, wherein a region in the record of regions corresponds in size to either:
   a minimum write granularity of attached host systems; or
   an amount of data larger than the minimum write granularity.

4. The method as recited in claim 1, wherein looking up the record of regions further comprises:
   looking up one or more markings in the record of regions, the markings corresponding to one or more logical block addresses in a range of the read request; and
   reading any available data from the disaster recovery storage volume for one or more available logical block addresses.

5. The method as recited in claim 1, wherein obtaining any unavailable data from the corresponding primary storage volume comprises obtaining a range of data comprising an integer number of regions corresponding to a range of the read request.

6. The method as recited in claim 1, wherein supplying the obtained data to the read request comprises satisfying the read request from the disaster recovery storage volume or from copied data in system memory.

7. The method as recited in claim 1, wherein the record of regions is a bitmap with each bit corresponding to a region of the disaster recovery storage volume.

8. The method as recited in claim 1, comprising:
determining if overlapping read requests are received at the disaster recovery system; and
in response to determining one or more overlapping read requests were received at the disaster recovery system, selectively obtaining only one copy of data from a primary system for the one or more overlapping read requests.

9. The method as recited in claim 1, comprising:
determining if there is an interruption during obtaining data from the primary system; and
resubmitting a copy request immediately or failing the read request.

10. The method as recited in claim 1, comprising: prioritizing one or more uncopied regions to be obtained from the primary system.

11. A system for copy-on-read process in disaster recovery, comprising:
a disaster recovery storage volume comprising a computer readable storage medium available at a disaster recovery system for read access before all data from a corresponding primary storage volume has been copied to the disaster recovery storage volume;
a record of regions of the disaster recovery storage volume, wherein a region is marked if a copy of data is available on the disaster recovery storage volume; and
a disaster recovery replication component configured to receive a read request for data at the disaster recovery system, the disaster recovery replication component further comprising: a disaster recovery record look up component configured to look up the record of regions to determine available data for the read request; a disaster recovery read component configured to read any available data from the disaster recovery storage volume; and a primary copy component further comprising:
a primary message component configured to obtain any unavailable data from the corresponding primary storage volume,
a disaster recovery write component configured to update the disaster recovery storage volume with the obtained data, a host reply component configured to supply the obtained data to the read request, and
a record mark up component configured to update the record of regions for the regions of the obtained data; and
an update component configured to:
receive an update for a region of the disaster recovery storage volume from a primary system; and
in response to determining no marking for the region exists in the record of regions, discarding the update, and
wherein the marking indicates that a copy of data is available on the disaster recovery storage volume.

12. The system as recited in claim 11, wherein the host reply component satisfies the read request from either:
the disaster recovery storage volume; or
copied data in system memory.

13. The system as recited in claim 11, wherein the record of regions is a B-tree.

14. The system as recited in claim 11, comprising an overlapping read component configured to:
determine if overlapping read requests are received at the disaster recovery system; and
in response to determining one or more overlapping read requests were received at the disaster recovery system, selectively obtain only one copy of data from the primary system for the overlapping read requests.

15. The system as recited in claim 11, comprising an interruption component configured to:
determine if an interruption occurs during obtaining data from the primary system; and
resubmit a copy request either immediately or upon failing the read request, in response to determining the interruption occurred.

16. The system as recited in claim 11, comprising a prioritizing component configured to prioritize uncopied regions obtained from the primary system.

17. The system as recited in claim 11, comprising a primary system, the primary system comprising:
a record of regions of the corresponding primary storage volume configured to mark a region when initial data is sent to a disaster recovery system; and
a record monitoring component configured to use the record of regions of the corresponding primary storage volume to determine whether one or more later writes should be immediately replicated to the disaster recovery system.

18. The system as recited in claim 11, wherein a region in the record of regions corresponds in size to an amount of data larger than a minimum write granularity of one or more attached host systems.

19. The system as recited in claim 11, wherein the disaster recovery record look up component is further configured to:
look up a marking in the record or regions for one or more logical block addresses in a range of the read request; and
read any available data from the disaster recovery storage volume for one or more available logical block addresses.

20. A computer program product for copy-on-read process in disaster recovery, the computer program product comprising a computer readable storage medium having program instructions embodied therewith, the program instructions readable/executable by a computer to cause the computer to perform a method comprising:
make, by the computer, a disaster recovery storage volume available at a disaster recovery system for read access before all data from a corresponding primary storage volume has been copied to the disaster recovery storage volume;
maintain, by the computer, a record of regions of the disaster recovery storage volume wherein a region is marked if a copy of data is available on the disaster recovery storage volume;
in response to receipt of a read request for data at the disaster recovery system:
look up the record of regions to determine available data for the read request; read any available data from the disaster recovery storage volume; obtain, from the corresponding primary storage volume, any data unavailable at the disaster recovery storage volume;

update the disaster recovery storage volume with the obtained data;
supply the obtained data to the read request; and
update the record of regions of the disaster recovery storage volume for the regions of the obtained data; and
receive an update for a region of the disaster recovery storage volume from a primary system; and
in response to determining no marking exists in the record of regions for the region of the disaster recovery storage volume, discard the update, and
wherein the marking indicates that a copy of data is available on the disaster recovery storage volume.

21. The computer program product as recited in claim 20, wherein the program instructions configured to cause the computer to look up the record of regions comprises program instructions configured to cause the computer to:
look up one or more markings in the record of regions, the one or more markings corresponding to one or more logical block addresses in a range of the read request; and
read any available data from the disaster recovery storage volume for one or more available logical block addresses.

* * * * *